(12) United States Patent
Nakahara et al.

(10) Patent No.: US 9,669,389 B2
(45) Date of Patent: Jun. 6, 2017

(54) CARRIER FOR INTERNAL-COMBUSTION ENGINE EXHAUST GAS PURIFICATION CATALYST

(75) Inventors: Yunosuke Nakahara, Saitama (JP); Takashi Wakabayashi, Saitama (JP); Yasunori Imada, Saitama (JP); Ohki Houshito, Saitama (JP); Yuki Nagao, Saitama (JP); Takahiko Sakaue, Yamaguchi (JP); Akihiro Nara, Yamaguchi (JP); Shinji Aoki, Yamaguchi (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 309 days.

(21) Appl. No.: 14/110,295

(22) PCT Filed: Oct. 20, 2011

(86) PCT No.: PCT/JP2011/074189
§ 371 (c)(1),
(2), (4) Date: Oct. 7, 2013

(87) PCT Pub. No.: WO2012/144098
PCT Pub. Date: Oct. 26, 2012

(65) Prior Publication Data
US 2014/0038818 A1     Feb. 6, 2014

(30) Foreign Application Priority Data

Apr. 22, 2011    (JP) ................................. 2011-096603

(51) Int. Cl.
*B01J 23/10*      (2006.01)
*B01J 37/02*      (2006.01)
(Continued)

(52) U.S. Cl.
CPC ............ *B01J 23/10* (2013.01); *B01D 53/945* (2013.01); *B01J 35/1014* (2013.01);
(Continued)

(58) Field of Classification Search
None
See application file for complete search history.

(56) References Cited

U.S. PATENT DOCUMENTS 7,989,387 B2    8/2011    Miura
8,026,193 B2    9/2011    Miura
(Continued)

FOREIGN PATENT DOCUMENTS

CN      1403377      3/2003
JP      10-218620      8/1998
(Continued)

OTHER PUBLICATIONS

Chinese Office Action, dated Aug. 26, 2014, in corresponding Chinese Patent Application No. 201180070227.8.
(Continued)

*Primary Examiner* — Melvin C Mayes
*Assistant Examiner* — Kenneth Vaden
(74) *Attorney, Agent, or Firm* — Young & Thompson

(57) ABSTRACT

An internal combustion engine exhaust gas purifying catalyst carrier has a core body formed of a $CeO_2$—$ZrO_2$ solid solution or a $CeO_2$—$ZrO_2$—$La_2O_2$ solid solution, and $CeO_2$ supported on the surface of the core body, wherein the core body has a $CeO_2$ content of 5 to 35 mass % and an $La_2O_2$ content of 0 to 10 mass %, on the basis of the mass of the carrier, and the amount of $CeO_2$ supported on the core body is 5 to 17 mass %, on the basis of the mass of the carrier.

3 Claims, 1 Drawing Sheet

(51) Int. Cl.
*B01D 53/94* (2006.01)
*B01J 35/10* (2006.01)

(52) U.S. Cl.
CPC ... *B01J 37/0221* (2013.01); *B01D 2255/2063* (2013.01); *B01D 2255/2065* (2013.01); *B01D 2255/407* (2013.01); *B01D 2255/908* (2013.01); *B01D 2255/9207* (2013.01); *B01J 2523/00* (2013.01); *F01N 2570/16* (2013.01); *Y02T 10/22* (2013.01)

(56) References Cited

U.S. PATENT DOCUMENTS

| | | |
|---|---|---|
| 8,293,677 B2 | 10/2012 | Miura |
| 2002/0107141 A1 | 8/2002 | Yoshikawa |
| 2004/0087440 A1 | 5/2004 | Kuno |

FOREIGN PATENT DOCUMENTS

| | | |
|---|---|---|
| JP | 2004-074138 | 3/2004 |
| JP | 2004-141833 | 5/2004 |
| JP | 2005-224792 | 8/2005 |
| JP | 3797313 | 4/2006 |
| JP | 2007-105571 | 4/2007 |
| JP | 2009-019537 | 1/2009 |
| WO | 2005102523 | 11/2005 |
| WO | 2005102524 | 11/2005 |
| WO | 2005102933 | 11/2005 |
| WO | 2006025613 | 3/2006 |
| WO | 2008146823 | 12/2008 |

OTHER PUBLICATIONS

Extended European Search Report, dated Oct. 9, 2014, in corresponding European Patent Application No. 11864070.5.
International Search Report, PCT/JP2011/074189, Jan. 31, 2012.

CARRIER FOR INTERNAL-COMBUSTION ENGINE EXHAUST GAS PURIFICATION CATALYST

TECHNICAL FIELD

The present invention relates to a carrier of a catalyst for purifying exhaust gas from an internal combustion engine (hereinafter referred to as an "internal combustion engine exhaust gas purifying catalyst") and, more particularly to a carrier of an internal combustion engine exhaust gas purifying catalyst which carrier exhibits excellent oxygen storage capacity (OSC) in a wide temperature range from low temperature to high temperature; i.e., in both an initial stage of engine starting and a high-temperature state.

BACKGROUND ART

Exhaust gas discharged from an internal combustion engine of, for example, an automobile contains toxic components such as HC, CO, and $NO_x$ (nitrogen oxides). Hitherto, three-way catalysts have been used for removing such toxic components for detoxifying the exhaust gas. Among such three-way catalysts, some catalysts are formed of a catalyst member material having an OSC for mitigating variation in oxygen concentration of exhaust gas, to thereby efficiently remove HC, CO, and $NO_x$. An example of the material having OSC is a $CeO_2$—$ZrO_2$ solid solution compound (see, for example, Patent Documents 1, 2, and 3). Meanwhile, oxygen storage capacity is known to be provided by a change of Ce valence. Studies have been carried out on $CeO_2$—$ZrO_2$ catalyst member material so as to enhance heat resistance and prevent sintering of noble metal supported on the carrier, by employing different compositional proportions between the particle core and the particle surface (see, for example, Patent Document 4).

PRIOR ART DOCUMENT

Patent Document

Patent Document 1: Japanese Patent Application Laid-Open (kokai) No. 2009-019537
Patent Document 2: Japanese Patent Application Laid-Open (kokai) No. 2005-224792
Patent Document 3: Japanese Patent Application Laid-Open (kokai) No. H10-218620
Patent Document 4: Japanese Patent No. 3797313

SUMMARY OF THE INVENTION

Problems to be Solved by the Invention

In recent years, emission regulations have become more and more rigorous, and there is keen demand for internal combustion engine exhaust gas purifying catalysts having toxic component removing performance at low temperature; i.e., in an initial stage of engine starting when the catalysts are not sufficiently activated. However, when a conventional material having OSC is employed, the OSC is unsatisfactory at low temperature, resulting in poor catalyst performance. One conceivable reason therefor is an insufficient amount of $CeO_2$, which effectively works at low temperature.

The present invention has been conceived in view of the foregoing. Thus, an object of the present invention is to provide a carrier of an internal combustion engine exhaust gas purifying catalyst (hereinafter referred to as an "internal combustion engine exhaust gas purifying catalyst carrier") which exhibits excellent OSC in a wide temperature range from low temperature to high temperature; i.e., in an initial stage of engine starting and in a high-temperature state.

Means for Solving the Problems

The present inventors have carried out extensive studies in order to attain the aforementioned object, and have found that particles of $CeO_2$, which is actively involved in toxic component removing reaction at low temperature in an initial stage of engine starting, are uniformly dispersed in an area in the vicinity of the surface of an internal combustion engine exhaust gas purifying catalyst carrier, whereby the amount of $CeO_2$—effectively working at low temperature—is increased, to thereby improve low-temperature OSC. The internal combustion engine exhaust gas purifying catalyst carrier of the present invention has been accomplished on the basis of this finding.

Accordingly, the present invention provides an internal combustion engine exhaust gas purifying catalyst carrier comprising a core body formed of a $CeO_2$—$ZrO_2$ solid solution, and $CeO_2$ supported on the surface of the core body, characterized in that the core body has a $CeO_2$ content of 5 to 35 mass %, on the basis of the mass of the carrier, and the amount of $CeO_2$ supported on the core body is 5 to 17 mass %, on the basis of the mass of the carrier.

The present invention also provides an internal combustion engine exhaust gas purifying catalyst carrier comprising a core body formed of a $CeO_2$—$ZrO_2$—$La_2O_2$ solid solution, and $CeO_2$ supported on the surface of the core body, characterized in that the core body has a $CeO_2$ content of 5 to 35 mass % and an $La_2O_2$ content of 1 to 10 mass %, on the basis of the mass of the carrier, and the amount of $CeO_2$ supported on the core body is 5 to 17 mass %, on the basis of the mass of the carrier.

Effects of the Invention

Through use of the internal combustion engine exhaust gas purifying catalyst carrier of the present invention, excellent OSC can be attained in a wide temperature range from low temperature to high temperature; i.e., in an initial stage of engine starting and in a high-temperature state.

MODES FOR CARRYING OUT THE INVENTION

Figure 1:
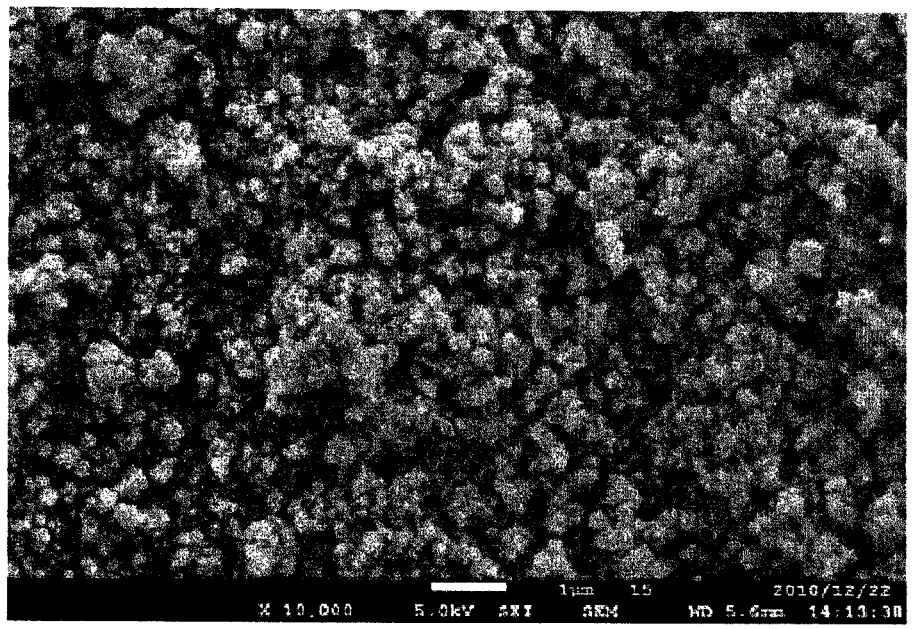
FIG. 1 A scanning electron microscopic image of a core body for producing a carrier of Example 5.

Specific embodiments of the present invention will be next described.

In a first mode of the present invention, there is provided an internal combustion engine exhaust gas purifying catalyst carrier comprising a core body formed of a $CeO_2$—$ZrO_2$ solid solution, and $CeO_2$ supported on the surface of the core body, characterized in that the core body has a $CeO_2$ content of 5 to 35 mass %, preferably 5 to 30 mass %, on the basis of the mass of the carrier, and the amount of $CeO_2$ supported on the core body is 5 to 17 mass %, preferably 5 to 15 mass %, on the basis of the mass of the carrier. More preferably, the sum of the amount of $CeO_2$ in the core body and the amount of $CeO_2$ supported on the surface of the core body is 10 to 40 mass % on the basis of the mass of the carrier. When the amount of $CeO_2$ in the core body is less than 5 mass % on the basis of the mass of the carrier, the carrier has poor OSC, whereas when the amount of $CeO_2$ in the core body is in excess of 35 mass % on the basis of the mass of the carrier, the carrier has poor effective $CeO_2$ ratio. When the amount of $CeO_2$ supported on the core body is less than 5 mass % on the basis of the mass of the carrier, the carrier has poor OSC, whereas when the amount of $CeO_2$ supported on the core body is in excess of 17 mass % on the basis of the mass of the carrier, the carrier has poor OSC and poor effective $CeO_2$ ratio. As used herein, the term "effective $CeO_2$ ratio" refers to the ratio of the amount of $CeO_2$ that contributes to OSC to the amount of $CeO_2$ contained in the carrier. In the internal combustion engine exhaust gas purifying catalyst carrier of the present invention, the core body formed of a $CeO_2$—$ZrO_2$ solid solution may further contain other components such as an oxide of Nd, Ba, Sr, or the like, so long as the effects of the present invention are not impaired.

In a second mode of the present invention, there is provided an internal combustion engine exhaust gas purifying catalyst carrier comprising a core body formed of a $CeO_2$—$ZrO_2$—$La_2O_2$ solid solution, and $CeO_2$ supported on the surface of the core body, characterized in that the core body has a $CeO_2$ content of 5 to 35 mass %, preferably 5 to 30 mass %, and an $La_2O_2$ content of 1 to 10 mass %, preferably 2 to 8 mass %, on the basis of the mass of the carrier, and the amount of $CeO_2$ supported on the core body is 5 to 17 mass %, preferably 5 to 15 mass %, on the basis of the mass of the carrier. More preferably, the sum of the amount of $CeO_2$ in the core body and the amount of $CeO_2$ supported on the surface of the core body is 10 to 40 mass % on the basis of the mass of the carrier. The limitations on the amount of $CeO_2$ in the core body and on the amount of $CeO_2$ supported on the surface of the core body are the same as described in relation to the first mode. In the second mode, since the core body contains $La_2O_3$, the heat resistance and OSC of the carrier can be improved, to thereby enhance durability of the catalyst. In order to attain the above effect, the amount of $La_2O_3$, must be 1 mass % or more on the basis of the mass of the carrier. However, when the amount of $La_2O_3$ is in excess of 10 mass %, the relative amount of $CeO_2$ and that of $ZrO_2$ decrease, possibly resulting in deterioration of carrier performance.

In the carrier of the present invention, the core body is formed of a $CeO_2$—$ZrO_2$ solid solution on which $CeO_2$ is supported, or a $CeO_2$—$ZrO_2$—$La_2O_3$ solid solution on which $CeO_2$ is supported. The core body may be produced through the following procedure: preparing an aqueous solution containing a Ce compound which forms $CeO_2$ through firing and a Zr compound which forms $ZrO_2$ through firing, or an aqueous solution containing a Ce compound which forms $CeO_2$ through firing, a Zr compound which forms $ZrO_2$ through firing, and an La compound which forms $La_2O_3$ through firing; adding an alkali such as ammonium carbonate or sodium hydroxide to thereby adjust the pH of the solution to about 6.0 to about 8.0; recovering the precipitated solid matter through filtration; washing and sufficiently drying the solid; and firing the dried solid at 600° C. to 1000° C. (for example, at 1,000° C. for 3 hours).

The carrier of the present invention may be produced through the following procedure: suspending, in water, the core body formed of the thus-prepared solid solution; dissolving a Ce compound which forms $CeO_2$ through firing (e.g., cerium nitrate, cerium sulfate, or cerium acetate) in the suspension; adding a precipitating agent (e.g., alkaline solution, a carbonate salt, or an oxalate salt), to thereby cause precipitation; recovering the precipitated solid through filtration; washing and sufficiently drying the solid; and firing the dried solid at 600° C. to 1000° C.

The present invention will next be described in detail by way of Examples and Comparative Examples.

Examples 1 to 7, and Comparative Examples 1 to 11

Table 1 shows the raw materials for producing the carriers of Comparative Examples 1 to 8; and the raw materials (i.e., cerium nitrate and zirconium nitrate, or cerium nitrate, zirconium nitrate, and lanthanum nitrate) for producing the carrier core bodies of Examples 1 to 7 and Comparative Examples 9 to 11, along with target compositional proportions (by mass). In each case, an aqueous solution was prepared from the corresponding raw materials, and ammonium carbonate serving as a precipitating agent was added so as to adjust the pH of the solution to 7.0. The precipitated matter was removed through filtration, and the solid was washed and sufficiently dried. The dried solid was fired at 1,000° C. for 3 hours, to thereby yield carriers of Comparative Examples 1 to 8 formed of the corresponding solid solution, and carrier core bodies of Examples 1 to 7 and Comparative Examples 9 to 11 formed of the corresponding solid solution. Table 1 also shows the compositional proportions (by mass) of the solid solutions forming the carriers of Comparative Examples 1 to 8.

Each of the thus-produced carrier core bodies of Examples 1 to 7 and Comparative Examples 9 to 11, formed of a solid solution, was suspended in water, and cerium nitrate was dissolved in the suspension in an amount so that the corresponding compositional proportions (by mass) shown in Table 1 was attained. Subsequently, ammonium carbonate, serving as a precipitating agent, was added thereto in such an amount that the pH of the solution was adjusted to 7.0. The precipitated matter was recovered, and the solid was washed and sufficiently dried. The dried solid was fired at 1,000° C. for 3 hours, to thereby yield a carrier formed of a core body on which $CeO_2$ was supported (each of Examples 1 to 7 and Comparative Examples 9 to 11). Table 1 shows the compositional proportions (by mass) of the carriers of Examples 1 to 7 and Comparative Examples 9 to 11. In each carrier listed in Table 1, the component enclosed by parentheses corresponds to a core body component, and $CeO_2$ posed before the core body component refers to $CeO_2$ deposited on the core body.

TABLE 1

|  | Compositional proportions | Type |
| --- | --- | --- |
| Comp. Ex. 1 | $30CeO_2$—$70ZrO_2$ | Solid solution |
| Comp. Ex. 2 | $15CeO_2$—$80ZrO_2$—$5La_2O_3$ | Solid solution |
| Comp. Ex. 3 | $20CeO_2$—$75ZrO_2$—$5La_2O_3$ | Solid solution |
| Comp. Ex. 4 | $25CeO_2$—$70ZrO_2$—$5La_2O_3$ | Solid solution |
| Comp. Ex. 5 | $30CeO_2$—$65ZrO_2$—$5La_2O_3$ | Solid solution |
| Comp. Ex. 6 | $35CeO_2$—$60ZrO_2$—$5La_2O_3$ | Solid solution |
| Comp. Ex. 7 | $40CeO_2$—$55ZrO_2$—$5La_2O_3$ | Solid solution |
| Comp. Ex. 8 | $50CeO_2$—$45ZrO_2$—$5La_2O_3$ | Solid solution |
| Ex. 1 | $10CeO_2/(20CeO_2$—$70ZrO_2)$ | Surface coating |
| Comp. Ex. 9 | $15CeO_2/(80ZrO_2$—$5La_2O_3)$ | Surface coating |
| Ex. 2 | $5CeO_2/(20CeO_2$—$70ZrO_2$—$5La_2O_3)$ | Surface coating |
| Ex. 3 | $10CeO_2/(20CeO_2$—$65ZrO_2$—$5La_2O_3)$ | Surface coating |
| Ex. 4 | $15CeO_2/(20CeO_2$—$60ZrO_2$—$5La_2O_3)$ | Surface coating |

TABLE 1-continued

| | Compositional proportions | Type |
|---|---|---|
| Comp. Ex. 10 | 20CeO$_2$/(20CeO$_2$—55ZrO$_2$—5La$_2$O$_3$) | Surface coating |
| Ex. 5 | 10CeO$_2$/(5CeO$_2$—80ZrO$_2$—5La$_2$O$_3$) | Surface coating |
| Ex. 6 | 10CeO$_2$/(10CeO$_2$—75ZrO$_2$—5La$_2$O$_3$) | Surface coating |
| Ex. 7 | 10CeO$_2$/(30CeO$_2$—55ZrO$_2$—5La$_2$O$_3$) | Surface coating |
| Comp. Ex. 11 | 10CeO$_2$/(40CeO$_2$—45ZrO$_2$—5La$_2$O$_3$) | Surface coating |

<Evaluation>

The OSC of each carrier was determined through the CO pulse method. Specific surface area (BET) was determined through the N$_2$ absorption method. In the following Tables, columns marked with "Fresh" correspond to evaluation of the carriers before aging, and columns marked with "Aged" correspond to evaluation of the carriers after completion of aging in air at 1,000° C. for 25 hours.

Table 2 shows the BET surface areas of the carries of Comparative Examples 1 and 5, Examples 1, 3, and 7, and Comparative Example 11.

TABLE 2

| | BET (m$^2$/g) | |
|---|---|---|
| | Fresh | Aged |
| Comp. Ex. 1 | 62 | 30 |
| Comp. Ex. 5 | 72 | 50 |
| Ex. 1 | 63 | 31 |
| Ex. 3 | 73 | 53 |
| Ex. 7 | 70 | 31 |
| Comp. Ex. 11 | 67 | 17 |

Tables 3 to 6 show OSC measurements of the carriers of Examples 1 to 7 and Comparative Examples 1 to 11.

TABLE 3

| | OSC (μmol-O$_2$/g) | | | | | | Effective CeO$_2$ ratio (%) | | | | | | CeO$_2$ content (mass %) | | | La$_2$O$_3$ |
|---|---|---|---|---|---|---|---|---|---|---|---|---|---|---|---|---|
| | Fresh | | | Aged | | | Fresh | | | Aged | | | | | | |
| Measured at (° C.) | 400 | 600 | 800 | 400 | 600 | 800 | 400 | 600 | 800 | 400 | 600 | 800 | Core | Surface | Total | % |
| Comp. Ex. 1 | 5 | 90 | 190 | 0 | 10 | 70 | 1.1 | 20.7 | 43.6 | 0.0 | 2.3 | 16.1 | 30 | 0 | 30 | 0 |
| Comp. Ex. 5 | 7 | 117 | 201 | 0 | 32 | 130 | 1.6 | 26.8 | 46.1 | 0.0 | 7.3 | 29.8 | 30 | 0 | 30 | 5 |
| Ex. 1 | 12 | 100 | 200 | 2 | 30 | 81 | 2.8 | 22.9 | 45.9 | 0.5 | 6.9 | 18.6 | 20 | 10 | 30 | 0 |
| Ex. 3 | 35 | 134 | 221 | 15 | 50 | 150 | 8.0 | 30.8 | 50.7 | 3.4 | 11.5 | 34.4 | 20 | 10 | 30 | 5 |

TABLE 4

| | OSC (μmol-O$_2$/g) | | | | | | Effective CeO$_2$ ratio (%) | | | | | | CeO$_2$ content (mass %) | | |
|---|---|---|---|---|---|---|---|---|---|---|---|---|---|---|---|
| | Fresh | | | Aged | | | Fresh | | | Aged | | | | | |
| Measured at (° C.) | 400 | 600 | 800 | 400 | 600 | 800 | 400 | 600 | 800 | 400 | 600 | 800 | Core | Surface | Total |
| Comp. Ex. 2 | 0 | 36 | 88 | 2 | 25 | 62 | 0.0 | 16.5 | 40.4 | 0.9 | 11.5 | 28.5 | 15 | 0 | 15 |
| Comp. Ex. 9 | 18 | 35 | 50 | 4 | 28 | 40 | 8.3 | 16.1 | 22.9 | 1.8 | 12.9 | 18.4 | 0 | 15 | 15 |
| Ex. 5 | 20 | 40 | 98 | 5 | 30 | 76 | 9.2 | 18.4 | 45.0 | 2.3 | 13.8 | 34.9 | 5 | 10 | 15 |

TABLE 5

| | OSC (μmol-O$_2$/g) | | | | | | Effective CeO$_2$ ratio (%) | | | | | | CeO$_2$ content (mass %) | | |
|---|---|---|---|---|---|---|---|---|---|---|---|---|---|---|---|
| | Fresh | | | Aged | | | Fresh | | | Aged | | | | | |
| Measured at (° C.) | 400 | 600 | 800 | 400 | 600 | 800 | 400 | 600 | 800 | 400 | 600 | 800 | Core | Surface | Total |
| Comp. Ex. 4 | 6 | 100 | 152 | 1 | 29 | 90 | 1.7 | 27.5 | 41.9 | 0.3 | 8.0 | 24.8 | 25 | 0 | 25 |
| Comp. Ex. 5 | 7 | 117 | 201 | 0 | 32 | 130 | 1.6 | 26.8 | 46.1 | 0.0 | 7.3 | 29.8 | 30 | 0 | 30 |
| Comp. Ex. 6 | 8 | 120 | 210 | 0 | 35 | 140 | 1.6 | 23.6 | 41.3 | 0.0 | 6.9 | 27.5 | 35 | 0 | 35 |
| Comp. Ex. 7 | 7 | 122 | 223 | 0 | 40 | 180 | 1.2 | 21.0 | 38.4 | 0.0 | 6.9 | 31.0 | 40 | 0 | 40 |
| Ex. 2 | 20 | 115 | 162 | 8 | 59 | 74 | 5.5 | 31.7 | 44.6 | 2.2 | 16.2 | 20.4 | 20 | 5 | 25 |
| Ex. 3 | 35 | 134 | 221 | 15 | 50 | 150 | 8.0 | 30.8 | 50.7 | 3.4 | 11.5 | 34.4 | 20 | 10 | 30 |
| Ex. 4 | 35 | 125 | 210 | 15 | 45 | 145 | 6.9 | 24.6 | 41.3 | 3.0 | 8.9 | 28.5 | 20 | 15 | 35 |
| Comp. Ex. 10 | 15 | 105 | 195 | 3 | 40 | 135 | 2.6 | 18.1 | 33.6 | 0.5 | 6.9 | 23.2 | 20 | 20 | 40 |

TABLE 6

| | OSC (μmol-O$_2$/g) | | | | | | Effective CeO$_2$ ratio (%) | | | | | | CeO$_2$ content (mass %) | | |
|---|---|---|---|---|---|---|---|---|---|---|---|---|---|---|---|
| | Fresh | | | Aged | | | Fresh | | | Aged | | | | | |
| Measured at (° C.) | 400 | 600 | 800 | 400 | 600 | 800 | 400 | 600 | 800 | 400 | 600 | 800 | Core | Surface | Total |
| Comp. Ex. 2 | 0 | 36 | 88 | 2 | 25 | 62 | 0.0 | 16.5 | 40.4 | 0.9 | 11.5 | 28.5 | 15 | 0 | 15 |
| Comp. Ex. 3 | 5 | 81 | 120 | 0 | 27 | 70 | 1.7 | 27.9 | 41.3 | 0.0 | 9.3 | 24.1 | 20 | 0 | 20 |
| Comp. Ex. 5 | 7 | 117 | 201 | 0 | 32 | 130 | 1.6 | 26.8 | 46.1 | 0.0 | 7.3 | 29.8 | 30 | 0 | 30 |
| Comp. Ex. 7 | 7 | 122 | 223 | 0 | 40 | 180 | 1.2 | 21.0 | 38.4 | 0.0 | 6.9 | 31.0 | 40 | 0 | 40 |
| Comp. Ex. 8 | 8 | 127 | 258 | 0 | 49 | 213 | 1.1 | 17.5 | 35.5 | 0.0 | 6.7 | 29.3 | 50 | 0 | 50 |
| Ex. 5 | 20 | 40 | 98 | 5 | 30 | 76 | 9.2 | 18.4 | 45.0 | 2.3 | 13.8 | 34.9 | 5 | 10 | 15 |
| Ex. 6 | 21 | 92 | 131 | 7 | 35 | 92 | 7.2 | 31.7 | 45.1 | 2.4 | 12.0 | 31.7 | 10 | 10 | 20 |
| Ex. 3 | 35 | 134 | 221 | 15 | 50 | 150 | 8.0 | 30.8 | 50.7 | 3.4 | 11.5 | 34.4 | 20 | 10 | 30 |
| Ex. 7 | 38 | 134 | 235 | 17 | 72 | 201 | 6.5 | 23.1 | 40.4 | 2.9 | 12.4 | 34.6 | 30 | 10 | 40 |
| Comp. Ex. 11 | 25 | 110 | 241 | 1 | 35 | 170 | 3.4 | 15.1 | 33.2 | 0.1 | 4.8 | 23.4 | 40 | 10 | 50 |

As is clear from Table 2, as compared with the carriers of Comparative Example 5 and Example 3, the BET specific surface areas of the carriers of Comparative Examples 1 and 5, and Examples 1 and 3, were almost the same in the "Fresh" and "Aged" cases. Among them, the performance of the carrier of Example 3 was slightly higher. Thus, deposition of CeO$_2$ on the surface of a core body did not impair BET or heat resistance. The carriers of Comparative Example 5 and Example 3, which were produced by adding La$_2$O$_2$ to the carriers of Comparative Example 1 and Example 1, exhibited large BET specific surface areas in the "Fresh" and "Aged" cases, indicating that addition of La$_2$O$_2$ to the carriers was able to improve heat resistance of the carriers.

As is clear from Table 3, the OSCs of the carriers of Comparative Examples 1 and 5, and Examples 1 and 3 were enhanced by addition of La$_2$O$_2$, leading to heat resistance. When the CeO$_2$ surface was coated, regardless of the addition of La$_2$O$_2$, OSCs were enhanced. This clearly indicates that addition of La$_2$O$_2$ does not affect the effect of coating the CeO$_2$ surface.

As is clear from table 4, the OSCs of the carriers of Comparative Examples 2 and 9, and Example 5, the carrier of Comparative Example 9 (15 mass % CeO$_2$ deposited selectively on the surface) exhibited a higher OSC at 400° C. as compared with the carrier of Comparative Example 2 (15 mass % CeO$_2$ uniformly dispersed in the carrier). In contrast, at high temperature, the carrier of Comparative Example 2 (15 mass % CeO$_2$ uniformly dispersed in the carrier) exhibited a higher OSC. Thus, selective CeO$_2$ deposition on the surface of the carrier, where the catalytic function is expressed in an initial operation stage, is thought to be effective for improvement of OSC at low temperature. However, at high temperature, where intra-lattice diffusion predominates, uniform dispersion of CeO$_2$ in the carrier is thought to be advantageous. Therefore, effective means for attaining high OSC from low temperature to high temperature is that in which surface CeO$_2$ enhances OSC at low temperature and CeO$_2$ uniformly dispersed in the carrier enhances OSC at high temperature. The carrier of Example 5 had a total CeO$_2$ content of 15 mass %, in which 5 mass % of CeO$_2$ serves as a surface coating, and the remaining 10 mass % of CeO$_2$ is dispersed in the core body. The carrier of Example 5 exhibited, in a low to high temperature range, characteristics of the carrier of Comparative Example 9 (15 mass % CeO$_2$ deposited selectively on the surface) and the carrier of Comparative Example 2 (15 mass % CeO$_2$ uniformly dispersed in the carrier). Accordingly, application of CeO$_2$ selectively onto the core body surface was found to be effective for improving OSC at low temperature.

In Table 5, the carriers of Comparative Examples 4 to 7, Examples 2 to 4, and Comparative Example 10 had different CeO$_2$ surface coating amounts, and variation in OSC of the carriers was observed. When the CeO$_2$-coated carriers of Examples 2 to 4 and Comparative Example 10 are compared with the CeO$_2$-non-coated carriers of Comparative Examples 4 to 7, the CeO$_2$-coated carriers having a CeO$_2$ coating amount of 15 mass % or less clearly exhibited high OSC. In contrast, the carrier of Comparative Example 10 having a CeO$_2$ coating amount of 20 mass % exhibited low OSC. Therefore, as shown in Table 5, the upper limit of the CeO$_2$ surface coating amount at which the effect of coating can be attained is considered to be 15 mass % to 20 mass %, specifically about 17 mass %. The CeO$_2$ surface coating amount is preferably 5 to 15 mass %. When the carrier of Example 3 (surface coating amount: 10 mass %) is compared with the carrier of Example 4 (surface coating amount: 15 mass %), The OSC of the carrier of Example 4 (surface coating amount: 15 mass %) was slightly low. Thus, the optimum surface coating amount is thought to be about 10 mass %.

In Table 6, the carriers of Comparative Examples 2, 3, 5, 7, 8, and 11, and Examples 3, 5, 6, and 7 had different CeO$_2$ amounts in the core bodies, and variation in OSC of the carriers was observed. The carriers of Comparative Examples 2, 3, 5, 7, and 8 had no surface CeO$_2$ coating, whereas the carriers of Examples 3, 5, 6, and 7, and Comparative Example 11 had a surface coating amount of 10 mass %. When the core body had a CeO$_2$ content of 30 mass % or less, CeO$_2$ surface coating predominantly functioned, whereas when the CeO$_2$ content of the core body was elevated to 40 mass %, CeO$_2$ surface coating became less important. A conceivable reason for this is that, when the sum of the amount of CeO$_2$ in the core body and the amount of CeO$_2$ supported on the surface of the core body was large, heat resistance of the carrier was poor, as shown in Table 2 (BET surface areas of Example 7 and Comparative Example 11). Therefore, as shown in Table 6, the upper limit of the CeO$_2$ amount in the core body is considered to be 30 mass % to 40 mass %, specifically about 35 mass %. The CeO$_2$ content of the core body is preferably about 5 to about 30 mass %. In addition, the sum of the amount of CeO$_2$ in the core body and the amount of CeO$_2$ supported on the surface of the core body is preferably 10 to 40 mass % on the basis of the mass of the carrier.

Figure 2:
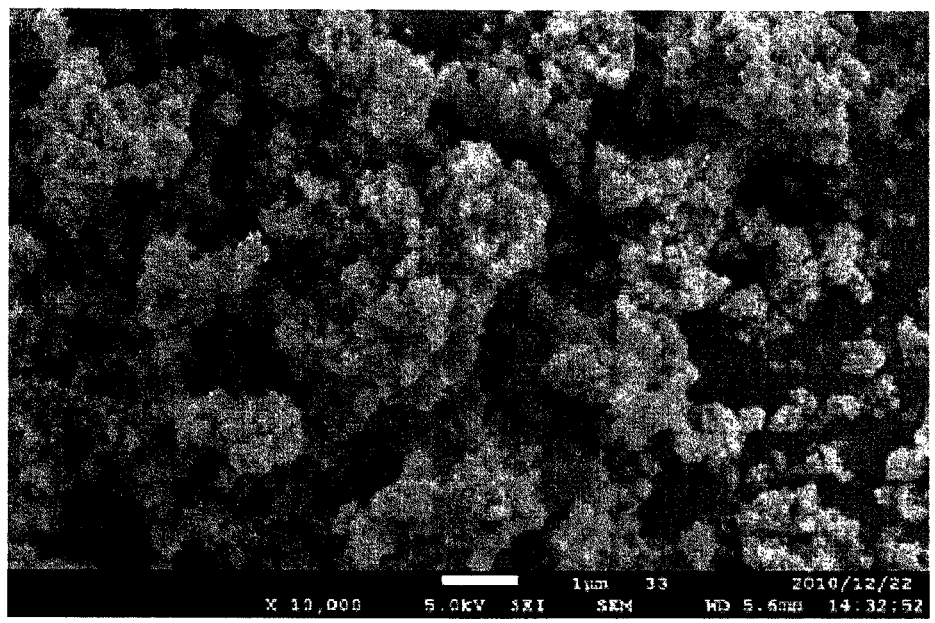
FIG. 2 A scanning electron microscopic image of a carrier prepared in Example 5.

Notably, FIG. 1 is a scanning electron microscopic image of a core body for producing the carrier of Example 5, and FIG. 2 is a scanning electron microscopic image of the carrier prepared in Example 5.

The invention claimed is:

1. An internal combustion engine exhaust gas purifying catalyst carrier comprising:
    a core body formed of a $CeO_2$—$ZrO_2$—$La_2O_3$ solid solution, and
    $CeO_2$ supported on the surface of the core body,
    wherein the core body has a $CeO_2$ content of 10 to 30[M] mass % and an $La_2O_3$ content of 1 to 10 mass %, and
    the amount of $CeO_2$ supported on the core body is 5 to 10 mass %,
    wherein the sum of the amount of $CeO_2$ in the core body and the amount of $CeO_2$ supported on the surface of the core body is to 40 mass %,
    each mass % being based on the combined mass of the $CeO_2$—$ZrO_2$—$La_2O_3$ core body and supported $CeO_2$.

2. The internal combustion engine exhaust gas purifying catalyst carrier according to claim 1, wherein the core body has an $La_2O_3$ content of 2 to 8 mass %, on the basis of the mass of the carrier.

3. The internal combustion engine exhaust gas purifying catalyst carrier according to claim 1, wherein the ratio of specific surface area (BET) of an aged carrier that has been aged in air at 1000° C. for 25 hours to specific surface area (BET) of a fresh non-aged carrier is between 44.3% and 72.6%.

* * * * *